(12) United States Patent
Sugiyama

(10) Patent No.: US 11,719,964 B2
(45) Date of Patent: Aug. 8, 2023

(54) OPTICAL DEVICE AND OPTICAL COMMUNICATION DEVICE

(71) Applicant: Fujitsu Optical Components Limited, Kawasaki (JP)

(72) Inventor: Masaki Sugiyama, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 8 days.

(21) Appl. No.: 17/334,040

(22) Filed: May 28, 2021

(65) Prior Publication Data

US 2022/0004031 A1 Jan. 6, 2022

(30) Foreign Application Priority Data

Jul. 3, 2020 (JP) .................................. 2020-115650

(51) Int. Cl.
*G02F 1/035* (2006.01)
*G02F 1/225* (2006.01)
*G02F 1/21* (2006.01)

(52) U.S. Cl.
CPC ............ *G02F 1/0356* (2013.01); *G02F 1/212* (2021.01); *G02F 1/2255* (2013.01)

(58) Field of Classification Search
None
See application file for complete search history.

(56) References Cited

U.S. PATENT DOCUMENTS

| 6,310,700 | B1 | 10/2001 | Betts | |
| 8,224,143 | B2* | 7/2012 | Masuda | G02F 1/035 385/11 |
| 2014/0086524 | A1 | 3/2014 | Ichikawa et al. | |
| 2016/0313579 | A1* | 10/2016 | Yokoyama | G02F 1/365 |
| 2022/0004031 | A1* | 1/2022 | Sugiyama | G02F 1/0356 |

FOREIGN PATENT DOCUMENTS

| JP | 2014-191250 | 10/2014 |
| JP | 2015-222439 | 12/2015 |

\* cited by examiner

*Primary Examiner* — Rhonda S Peace
(74) *Attorney, Agent, or Firm* — Staas & Halsy LLP

(57) ABSTRACT

An optical device includes: a ground electrode having a ground potential; a thin film optical waveguide formed by a thin film substrate stacked on the ground electrode; a signal electrode that is arranged at a position facing the ground electrode across the thin film optical waveguide and that transmits a high frequency signal; and a dielectric that covers at least a part of an exposed surface of the signal electrode.

6 Claims, 4 Drawing Sheets

OPTICAL DEVICE AND OPTICAL COMMUNICATION DEVICE

CROSS-REFERENCE TO RELATED APPLICATION

This application is based upon and claims the benefit of priority of the prior Japanese Patent Application No. 2020-115650, filed on Jul. 3, 2020, the entire contents of which are incorporated herein by reference.

FIELD

The embodiments discussed herein are related to an optical device and an optical communication device.

BACKGROUND

In general, an optical device such as an optical modulator may include an optical modulator chip having an optical waveguide formed on a chip surface. The optical modulator chip includes a signal electrode arranged on the optical waveguide. When a voltage is applied to the signal electrode, an electric field in a direction perpendicular to the surface of the optical modulator chip is generated in the optical waveguide. The generation of the electric field changes the refractive index of the optical waveguide, which also changes the phase of the light propagating through the optical waveguide, making it possible to modulate the light. That is, the optical waveguide of the optical modulator chip can form a Mach-Zehnder interferometer, for example, and can output an IQ signal that undergoes XY polarization multiplexing, for example, by the phase difference of beams of light between a plurality of optical waveguides arranged in parallel.

When the optical modulator chip executes high-speed modulation, a high-speed signal having a band of several tens of GHz is input to a signal electrode arranged along the optical waveguide. Therefore, the signal electrode sometimes adopts a coplanar structure capable of obtaining wideband transmission characteristics. That is, a signal electrode and a pair of ground electrodes on either side of the signal electrode are sometimes arranged above the optical waveguide.

On the other hand, the optical waveguide is sometimes formed at a position in alignment with a signal electrode by diffusing a metal such as titanium from the surface of the substrate. In addition, a thin film optical waveguide using a thin film of lithium niobate (LN) crystal is sometimes formed at a position in alignment with the signal electrode. The thin film optical waveguide can intensify the confinement of light as compared with the diffusion optical waveguide that diffuses metal, leading to improvement of the application efficiency of the electric field, and reduction of the drive voltage.

FIG. 8 is a cross-sectional view illustrating a specific example of a thin film optical waveguide. As illustrated in FIG. 8, a buffer layer 20 formed of silicon dioxide ($SiO_2$) is stacked on a LN substrate 10, and a thin film LN substrate 30 is stacked on the buffer layer 20. An optical waveguide 1 protruding upward is formed in the center of the thin film LN substrate 30. In addition, the thin film LN substrate 30 and the optical waveguide 1 are covered with a buffer layer 40, and a signal electrode having a coplanar structure is arranged on the surface of the buffer layer 40. That is, a signal electrode 2S is arranged at a position in alignment with the optical waveguide 1, with a pair of ground electrodes 2G arranged on either side of the signal electrode 2S.

With such a thin film optical waveguide, the light propagating in the optical waveguide 1 can be modulated by applying a voltage to the signal electrode 2S to generate an electric field and changing the refractive index of the optical waveguide 1. Furthermore, since the thin film LN substrate 30 and the optical waveguide 1 are stacked on the buffer layer 20, light can be reliably confined in the optical waveguide 1, making it possible to reduce the drive voltage applied to the signal electrode 2S.

Patent Literature 1: Japanese Laid-open Patent Publication No. 2015-222439

Patent Literature 2: Japanese Laid-open Patent Publication No. 2014-191250

Patent Literature 3: U.S. Pat. No. 6,310,700

Meanwhile, the thin film optical waveguide is likely to have an increased light propagation loss, leading to an increase of light insertion loss. In view of this, it is conceivable to use a signal electrode having a microstrip structure instead of the signal electrode having a coplanar structure. The signal electrode having a microstrip structure would further increase the electric field application efficiency, making it possible to enhance the modulation efficiency per unit length of the optical waveguide, leading to the reduction of length of the signal electrode. As a result, the insertion loss of light in the optical waveguide can be reduced.

On the other hand, the use of a signal electrode having a microstrip structure includes a problem that the modulation band is narrow. Specifically, in a signal electrode having a microstrip structure, the effective refractive index (equivalent refractive index) of the microwave transmitted by the signal electrode is small, and therefore, the speed of the microwave is higher than the speed of light propagating in the optical waveguide. As a result, the modulation efficiency is lowered especially in the high frequency band, narrowing the modulation band.

SUMMARY

According to an aspect of an embodiment, an optical device includes: a ground electrode having a ground potential; a thin film optical waveguide formed by a thin film substrate stacked on the ground electrode; a signal electrode that is arranged at a position facing the ground electrode across the thin film optical waveguide and that transmits a high frequency signal; and a dielectric that covers at least a part of an exposed surface of the signal electrode.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The present invention is not limited to the present embodiments.

[a] First Embodiment

Figure 1:
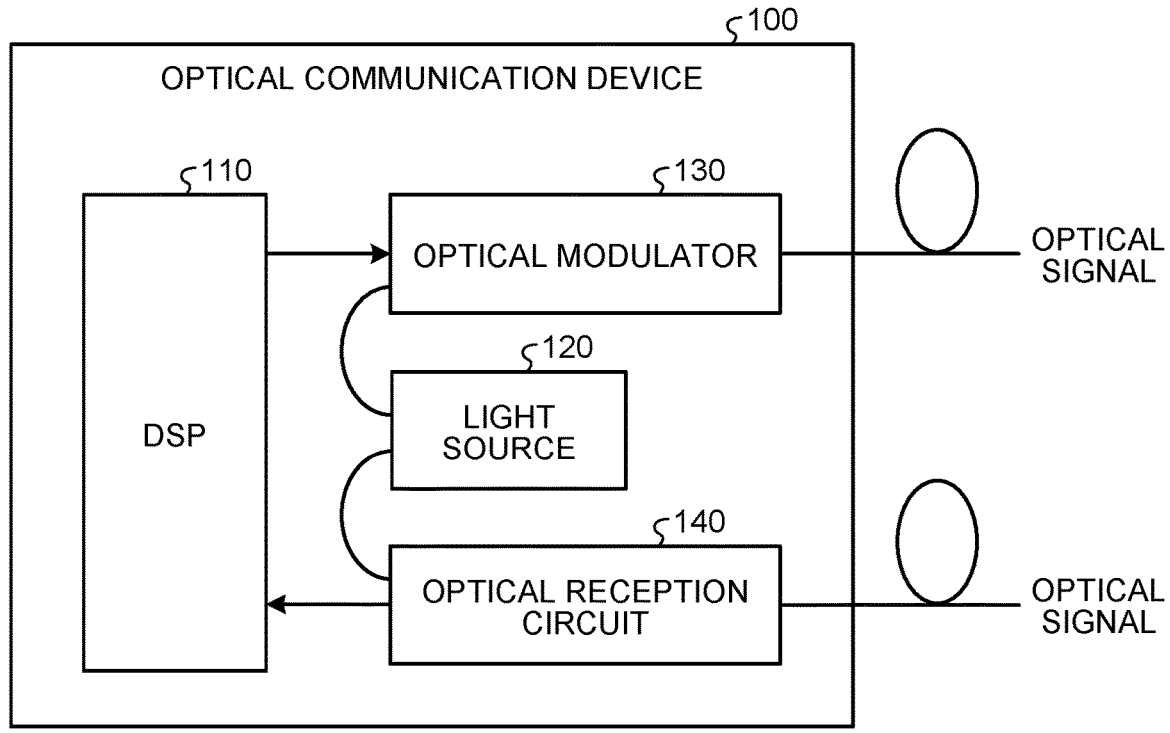
FIG. 1 is a block diagram illustrating a configuration of an optical communication device according to a first embodiment.

FIG. 1 is a block diagram illustrating a configuration of an optical communication device 100 according to a first embodiment. The optical communication device 100 illustrated in FIG. 1 includes a Digital Signal Processor (DSP) 110, a light source 120, an optical modulator 130, and an optical reception circuit 140.

The DSP 110 is an electrical component that performs digital signal processing. Specifically, the DSP 110 executes processes such as coding of transmission data, generates an electrical signal including the transmission data, and outputs the electrical signal to the optical modulator 130. Furthermore, the DSP 110 acquires an electrical signal including the received data from the optical reception circuit 140, executes processes such as decoding of the electrical signal, and obtains the received data.

The light source 120 includes a laser diode, for example, and generates light having a predetermined wavelength and supplies the light to the optical modulator 130 and the optical reception circuit 140.

The optical modulator 130 modulates the light supplied from the light source 120 by using the electrical signal output from the DSP 110, and sends out the obtained optical transmission signal to the optical fiber. As will be described below, the optical modulator 130 includes a thin film optical waveguide and a signal electrode having a microstrip structure. When the light supplied from the light source 120 propagates through the thin film optical waveguide, the optical modulator 130 modulates the light by an electrical signal input to the signal electrode, and generates the optical transmission signal. The configuration of the optical modulator 130 will be described in detail below.

The optical reception circuit 140 receives an optical signal from an optical fiber and demodulates the received optical signal using the light supplied from the light source 120. The optical reception circuit 140 then converts the received optical signal into an electrical signal, and outputs the obtained electrical signal to the DSP 110.

Figure 2:
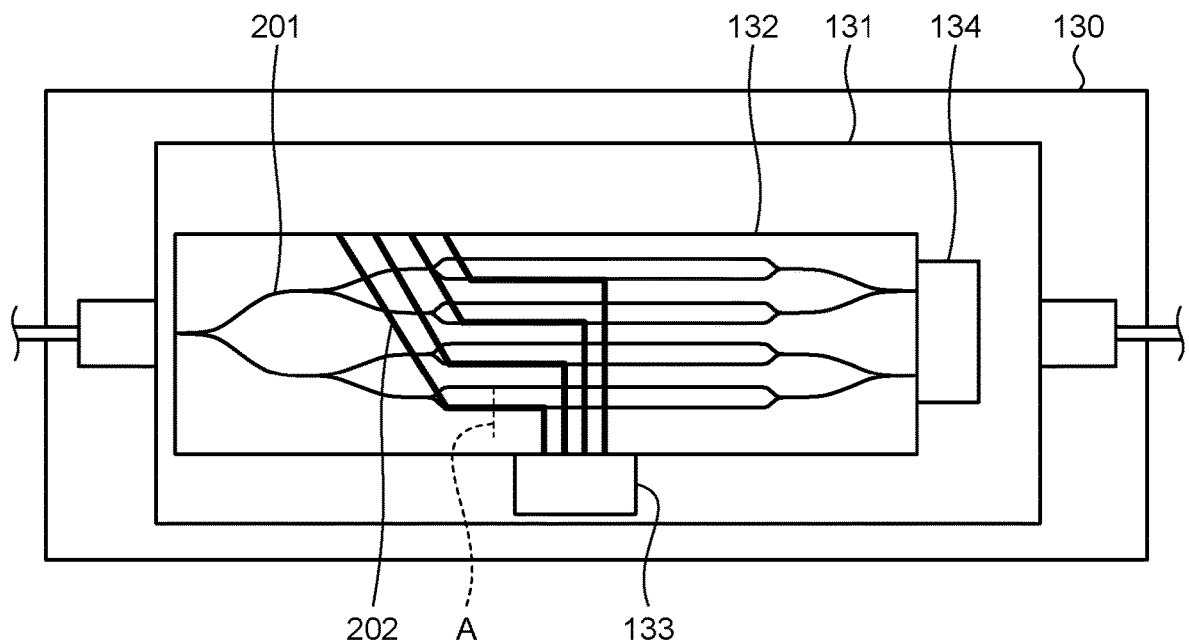
FIG. 2 is a schematic plan view illustrating a configuration of an optical modulator according to the first embodiment.

FIG. 2 is a schematic plan view illustrating the configuration of the optical modulator 130. The optical modulator 130 illustrated in FIG. 2 includes an optical modulator chip 131, an optical waveguide substrate 132, a Radio Frequency (RF) terminator 133, and a Polarization Beam Combiner (PBC) 134.

The optical modulator chip 131 is a semiconductor chip connected, on the input side, to the optical fiber from the light source 120, while connected, on the output side, to the optical fiber for sending out a transmission signal. The optical waveguide substrate 132, the RF terminator 133, and the PBC 134 are mounted on the optical modulator chip 131.

The optical waveguide substrate 132 includes a thin film optical waveguide 201 and a signal electrode 202. When the light supplied from the light source 120 propagates through the thin film optical waveguide 201, the optical waveguide substrate 132 modulates the light by the electric field applied from the signal electrode 202.

The thin film optical waveguide 201 is an optical waveguide formed by using a thin film LN substrate, for example, and repeatedly branches from the input side of the optical modulator chip 131 to constitute a Mach-Zehnder interferometer having a plurality of parallel optical waveguides. The modulated light after propagating through the thin film optical waveguide 201 is output to the PBC 134.

The signal electrode 202 is a transmission path having a microstrip structure provided at a position in alignment with the thin film optical waveguide 201, and applies an electric field to the thin film optical waveguide 201 corresponding to an electrical signal output from the DSP 110. The terminal of the signal electrode 202 is connected to the RF terminator 133. Furthermore, at least a part of the exposed surface of the signal electrode 202 is covered with a dielectric, leading to an increase in the effective refractive index (equivalent refractive index) of the microwave transmitted by the signal electrode 202. This lowers the speed of microwaves transmitted by the signal electrode 202 so as to approach the speed of light propagating through the thin film optical waveguide 201. This makes it possible to suppress a decrease in modulation efficiency in the high frequency band, leading to achievement of a widened modulation band.

The RF terminator 133 is connected to the terminal of the signal electrode 202 on the optical waveguide substrate 132 so as to prevent unwanted reflection of the signal transmitted by the signal electrode 202.

Arranged on the output side of the optical waveguide substrate 132, the PBC 134 is used to combine polarization beams of modulated light that have propagated through the thin film optical waveguide 201. That is, the PBC 134 combines a set of beams of light output from the optical waveguide substrate 132 as horizontally polarized waves and vertically polarized waves individually, for example.

Figure 3:
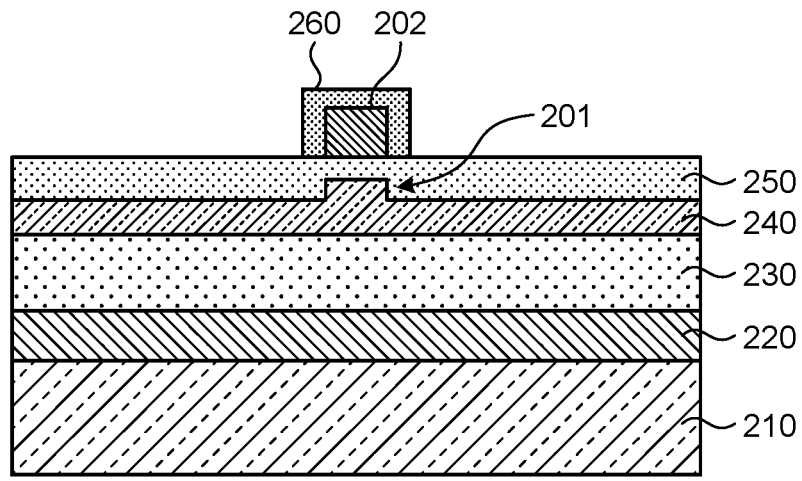
FIG. 3 is a cross-sectional view illustrating a configuration of the optical modulator according to the first embodiment.

Next, a configuration of the optical waveguide substrate 132 will be specifically described. FIG. 3 is a cross-sectional view illustrating a cross section of a line segment A in FIG. 2.

As illustrated in FIG. 3, regarding portions of the thin film optical waveguide 201 and the signal electrode 202, there is provided a ground electrode 220 having a microstrip structure stacked on a LN substrate 210, and a thin film LN substrate 240 being sandwiched between buffer layers 230 and 250 is stacked on the ground electrode 220.

The LN substrate 210 is a substrate formed of lithium niobate (LN) having a thickness of approximately several hundred μm, for example. The ground electrode 220 is an electrode formed of a metal such as copper, having a ground potential and having a thickness of 0.5 μm to 5 μm, for example. The buffer layer 230 is a layer of a thickness of 1 μm to 10 μm formed of a transparent material having a high refractive index, such as silicon dioxide ($SiO_2$) or titanium dioxide ($TiO_2$). Similarly, the buffer layer 250 is a layer formed of $SiO_2$, $TiO_2$, or the like and having a thickness of 0.2 μm to 3 μm.

The thin film LN substrate 240 having a thickness of 0.5 μm to 3 μm is sandwiched between the buffer layers 230 and 250. In addition, the thin film optical waveguide 201 protruding upward is formed in the center of the thin film LN substrate 240. The width of the protrusion functioning as the thin film optical waveguide 201 is approximately 1 μm to 8 μm, for example. The thin film LN substrate 240 and the thin film optical waveguide 201 are covered with the buffer layer 250, and the signal electrode 202 is arranged on the surface of the buffer layer 250. That is, the signal electrode 202 faces the ground electrode 220 across the thin film optical waveguide 201, and constitutes a transmission path having a microstrip structure.

The signal electrode 202 is formed of a metal such as copper, and has a width of 2 μm to 10 μm and a height of 1 μm to 20 μm. By transmitting a high frequency signal that corresponds to the electrical signal output from the DSP 110 by the signal electrode 202, an electric field in a direction from the signal electrode 202 to the ground electrode 220 is generated. This electric field is applied to the thin film optical waveguide 201. This changes the refractive index of the thin film optical waveguide 201, making it possible to modulate the light propagating through the thin film optical waveguide 201.

The exposed side surface and the top surface of the signal electrode 202 are covered with a dielectric film 260. The dielectric film 260 can be fabricated by using a film on which $SiO_2$, $TiO_2$, aluminum oxide ($Al_2O_3$), tantalum pentoxide ($Ta_2O_5$) or the like is deposited, or a silicon oxynitride film (SiON film) and so on. When forming the dielectric film 260 using these dielectric materials, it is possible to perform deposition by using a sputtering method, for example. The thickness of the dielectric film 260 is approximately 0.4 μm to 5 μm, for example.

By covering the exposed surface of the signal electrode 202 with the dielectric film 260, the effective refractive index of the microwave transmitted by the signal electrode 202 is increased. The magnitude of the effective refractive index can be adjusted to a desired magnitude by changing the thickness of the dielectric film 260. In addition, the speed of microwaves decreases with an increase in the effective refractive index, approaching the speed of light propagating through the thin film optical waveguide 201. This results in suppression of a decrease in modulation efficiency in the high frequency band, leading to achievement of a widened modulation band.

As described above, according to the present embodiment, the thin film optical waveguide is arranged between the signal electrode having a microstrip structure and the ground electrode, and the signal electrode is covered with the dielectric film. This increases the effective refractive index of the microwaves transmitted by the signal electrode and decreases the speed of the microwaves, approaching the speed of light propagating through the thin film optical waveguide. This results in suppression of a decrease in modulation efficiency in the high frequency band, leading to achievement of a widened modulation band.

As described above, since the magnitude of the effective refractive index can be adjusted by changing the thickness of the dielectric film 260, the size (width and height) of the signal electrode 202 can be altered with relatively high degree of freedom.

Figure 4:
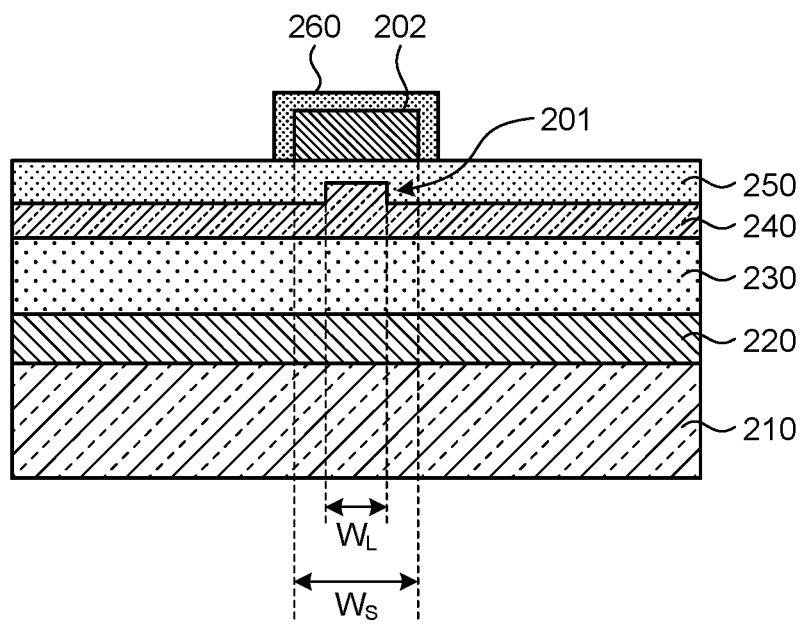
FIG. 4 is a cross-sectional view illustrating a modification of the optical modulator according to the first embodiment.

Specifically, for example, as illustrated in FIG. 4, a width $W_S$ of the signal electrode 202 may be formed to be greater than a width $W_L$ of the thin film optical waveguide 201. This further enhances the efficiency of applying the electric field to the thin film optical waveguide 201, making it possible to reduce the drive voltage. Furthermore, the increased width $W_S$ of the signal electrode 202 would increase the cross-sectional area of the signal electrode 202 and lower the resistance value, leading to signal band improvement.

Figure 5:
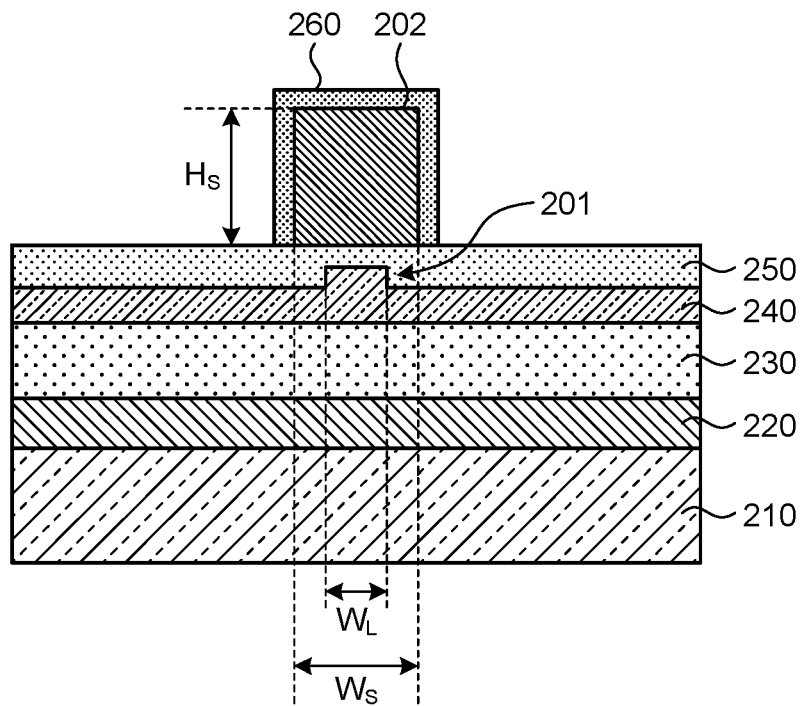
FIG. 5 is a cross-sectional view illustrating another modification of the optical modulator according to the first embodiment.

Furthermore, for example, as illustrated in FIG. 5, the signal electrode 202 may have a cross-sectional shape in which a height $H_S$ is greater than the width $W_S$. This makes it possible to increase the cross-sectional area of the signal electrode 202 while suppressing the decrease in impedance of the signal electrode 202 and suppressing the reflection in the high frequency band.

[b] Second Embodiment

The second embodiment is characterized in that the signal electrode is embedded in the dielectric layer so as to cover the side surface of the signal electrode with the dielectric layer.

The configurations of the optical communication device and the optical modulator according to the second embodiment are similar to the configurations in the first embodiment, and thus, description will be omitted. In the second embodiment, the configuration of the optical waveguide substrate 132 differs from the configuration in the first embodiment.

Figure 6:
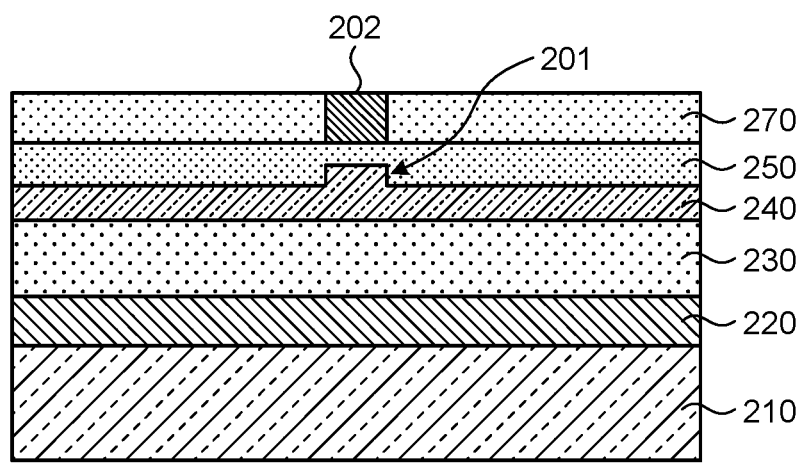
FIG. 6 is a cross-sectional view illustrating a configuration of an optical modulator according to a second embodiment.

FIG. 6 is a cross-sectional view illustrating the configuration of the optical waveguide substrate 132 according to the second embodiment. FIG. 6 illustrates a cross section at a line segment A in FIG. 2, similar to FIG. 3. In FIG. 6, the same components as those in FIG. 3 are designated by the same reference numerals, and the description thereof will be omitted.

As illustrated in FIG. 6, in the second embodiment, a dielectric layer 270 is stacked on the buffer layer 250. The position where the dielectric layer 270 is in alignment with the thin film optical waveguide 201 is formed into an opening, and the signal electrode 202 is arranged at the opening. Therefore, the side surface of the signal electrode 202 is covered with the dielectric layer 270, while the top surface of the signal electrode 202 is exposed.

The dielectric layer 270 can be fabricated by using a film on which $SiO_2$, $TiO_2$, $Al_2O_3$, $Ta_2O_5$ or the like is deposited, or a SiON film. When forming the dielectric layer 270 using these dielectric materials, it is possible to perform deposition by using a sputtering method, for example. When the dielectric layer 270 and the buffer layer 250 are formed of the same material, there is no need to separately provide the dielectric layer 270 and the buffer layer 250, and it is allowable to provide a dielectric layer integrating the dielectric layer 270 and the buffer layer 250.

The opening of the dielectric layer 270 is formed by, for example, etching or lift-off to remove the dielectric at a position in alignment with the thin film optical waveguide 201. In addition, the signal electrode 202 is formed in the opening of the dielectric layer 270 by vapor deposition and plating of a metal such as copper, for example. This procedure leads to formation of the signal electrode 202 whose side surface is covered with the dielectric layer 270. Such a forming method can omit the necessity to form a dielectric film on the side surface or the top surface of the signal electrode 202, simplifying the manufacturing process of the optical waveguide substrate 132.

By covering the side surface of the signal electrode 202 with the dielectric layer 270, the effective refractive index of the microwave transmitted by the signal electrode 202 is increased. The magnitude of the effective refractive index can be adjusted to a desired magnitude by changing the thickness of the dielectric layer 270 in a width direction of the signal electrode 202. The thickness of the dielectric layer 270 in the width direction of the signal electrode 202 can be changed by removing unnecessary portions by etching or lift-off, for example. In addition, the speed of microwaves would decrease with an increase in the effective refractive index, approaching the speed of light propagating through the thin film optical waveguide 201. This results in suppression of a decrease in modulation efficiency in the high frequency band, leading to achievement of a widened modulation band.

As described above, according to the present embodiment, the thin film optical waveguide is arranged between the signal electrode of the microstrip structure and the ground electrode, and the side surface of the signal electrode embedded in the dielectric layer is covered with the dielectric layer. This increases the effective refractive index of the microwaves transmitted by the signal electrode and decreases the speed of the microwaves, approaching the speed of light propagating through the thin film optical waveguide. This results in suppression of a decrease in modulation efficiency in the high frequency band, leading to achievement of a widened modulation band. In addition, a signal electrode covered with a dielectric can be easily formed.

Figure 7:
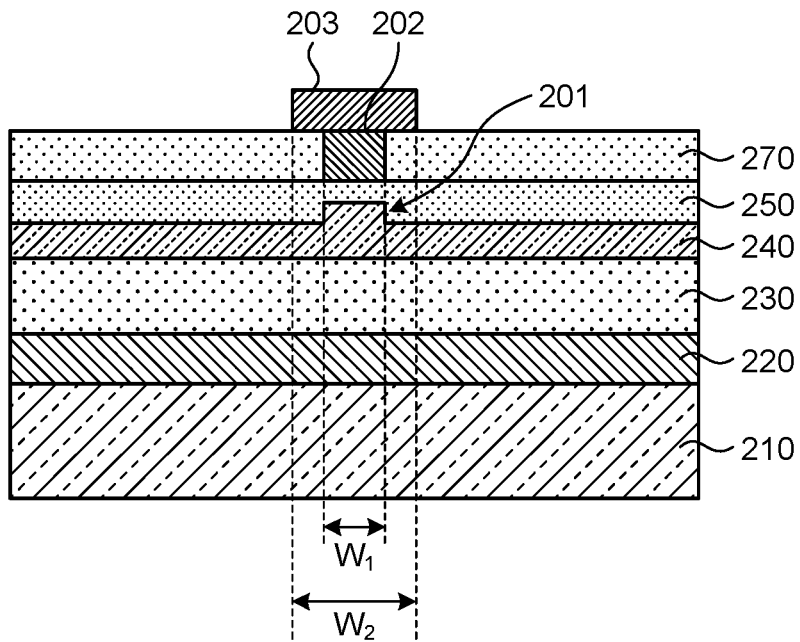
FIG. 7 is a cross-sectional view illustrating a modification of the optical modulator according to the second embodiment.
Figure 8:
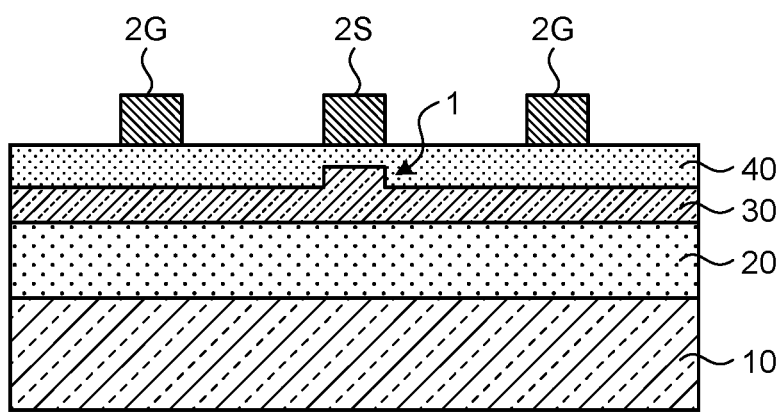
FIG. 8 is a cross-sectional view illustrating a specific example of a thin film optical waveguide.

In the second embodiment, in order to increase the cross-sectional area of the signal electrode 202 and reduce the resistance value, an additional electrode 203 may be connected to the top surface of the signal electrode 202, as illustrated in FIG. 7, for example. At this time, a width $W_2$ of the additional electrode 203 may be formed to be greater than a width $W_1$ of the signal electrode 202 to efficiently increase the cross-sectional area. That is, the additional electrode 203 may be formed so as to extend from the top surface of the signal electrode 202 to the top surface of the dielectric layer 270.

The additional electrode 203 is fabricated by forming a film of resist having an opening having a width $W_2$ on the top surface of the dielectric layer 270, for example, and depositing and plating a metal such as copper in the opening. At this time, the additional electrode 203 may be formed in a step different from that for the signal electrode 202. However, it is also allowable to first form the opening for the signal electrode 202 in the dielectric layer 270 and thereafter form a film of resist on the top surface of the dielectric layer 270 so as to perform vapor deposition and plating, thereby simultaneously fabricating the electrodes, that is, an electrode integrating the signal electrode 202 with the additional electrode 203.

Although the second embodiment is an exemplary case where the height of the signal electrode 202 and the thickness of the dielectric layer 270 are the same, the height of the signal electrode 202 and the thickness of the dielectric layer 270 need not be the same. That is, for example, the thickness of the dielectric layer 270 may be smaller than the height of the signal electrode 202, and a portion of the side surface of the signal electrode 202 close to the buffer layer 250 may be selectively covered with the dielectric layer 270. The electric field generated from the signal electrode 202 has higher intensity toward the lower side near the ground electrode 220. Accordingly, by covering the lower side of the side surface of the signal electrode 202 close to the buffer layer 250 by the dielectric layer 270, it is possible to efficiently increase the effective refractive index.

According to one aspect of the optical device and the optical communication device disclosed in the present application, there is an effect of achieving a widened modulation band.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An optical device comprising:
    a ground electrode having a ground potential;
    a thin film optical waveguide formed by a thin film substrate stacked on the ground electrode;
    a dielectric layer that is stacked on the thin film substrate, the position where the dielectric layer is in alignment with the thin film optical waveguide being formed into an opening;
    a signal electrode embedded in the opening and that transmits a high frequency signal,
    wherein a side surface of the signal electrode is covered with the dielectric layer, while a top surface of the signal electrode is exposed.
2. The optical device according to claim 1, further comprising:
    a first buffer layer stacked between the ground electrode and the thin film substrate; and
    a second buffer layer that is stacked on the thin film substrate and that covers the thin film optical waveguide, wherein
    the signal electrode is arranged on a surface of the second buffer layer at a position in alignment with the thin film optical waveguide.
3. The optical device according to claim 1, wherein the signal electrode has a width greater than a width of the thin film optical waveguide.
4. The optical device according to claim 1, wherein the signal electrode has a cross-sectional shape having a height greater than a width.
5. The optical device according to claim 1, wherein the signal electrode includes:
    a second electrode that connects to a surface of the first electrode far from the ground electrode and that is wider than the first electrode.
6. An optical communication device comprising:
    a processor that executes signal processing on an electrical signal;
    a light source that generates light; and
    an optical device that modulates the light generated from the light source by using the electrical signal output from the processor,
    wherein the optical device includes:
        a ground electrode having a ground potential;
        a thin film optical waveguide formed by a thin film substrate stacked on the ground electrode;
        a dielectric layer that is stacked on the thin film substrate, the position where the dielectric layer is in alignment with the thin film optical waveguide being formed into an opening;

a signal electrode that is embedded in the opening and that transmits a high frequency signal,
wherein a side surface of the signal electrode is covered with the dielectric layer, while a top surface of the signal electrode is exposed.

* * * * *